United States Patent

[11] 3,603,106

| [72] | Inventors | John W. Ryan<br>688 Nimes Road, Bel Air;<br>Wallace H. Shapero, 23139 Anza Avenue,<br>Torrance, both of, Calif. 90505 |
|---|---|---|
| [21] | Appl. No. | 810,957 |
| [22] | Filed | Mar. 27, 1969 |
| [45] | Patented | Sept. 7, 1971 |

[54] THERMODYNAMIC CONTAINER
9 Claims, 3 Drawing Figs.

[52] U.S. Cl............................................... 62/457,
62/471, 220/14, 126/400
[51] Int. Cl............................................... F25d 3/08
[50] Field of Search............................................... 62/457,
471; 220/14; 126/400

[56] References Cited
UNITED STATES PATENTS

| 907,099 | 12/1908 | Trowbridge | 62/457 |
|---|---|---|---|
| 1,369,367 | 2/1921 | Thomson | 62/457 |
| 2,876,634 | 3/1959 | Zimmerman | 126/400 X |
| 2,915,397 | 12/1959 | Telkes | 126/400 X |
| 2,967,984 | 1/1961 | Jamison | 165/104 X |
| 3,013,104 | 12/1961 | Young | 174/52 |
| 3,205,677 | 9/1965 | Stover | 62/457 |
| 3,463,140 | 8/1969 | Roller | 126/400 X |

*Primary Examiner*—William J. Wye
*Attorney*—Herzig & Walsh

ABSTRACT: This invention relates to food and beverage containers and more particularly to containers of the thermodynamic type capable of regulating the temperature of the food and beverage therein. The thermodynamic container disclosed herein comprises an outer wall of low thermal conductivity separated by an insulating material from an inner metal capsule of very high thermal conductivity having a heat-storage material disposed therein. Beverages too hot to drink melt the heat-storage material which in turn cools the beverage to a drinkable temperature within two minutes. Heat lost during the beverage's cooling is then returned to the beverage to maintain it at a drinkable temperature as the heat-storage material resolidifies.

PATENTED SEP 7 1971          3,603,106

INVENTOR
JOHN W. RYAN
WALLACE H. SHAPERO
BY Herzig + Walsh
ATTORNEYS 3,603,106

THERMODYNAMIC CONTAINER

SUMMARY OF THE INVENTION

This invention relates to food and beverage containers particularly adapted for controlling the temperature of beverages therein, especially coffee, tea and the like.

One of the great troubles found by drinkers of hot beverages, such as coffee, is the wait for the coffee to cool to a drinkable temperature. Commuters in a hurry and others who may not be able to wait for the beverage to cool run the risk of burning themselves if they drink the beverage before it has cooled to a drinkable temperature. On the other hand, maintaining the beverage at a drinkable temperature is also a problem, especially for those who add cream and sugar to their coffee, for each time their coffee is warmed with fresh coffee, they must repeat the process of adjusting the mixture to their taste by adding more cream and sugar.

The teaching of H.G. Zimmerman et al. in U.S. Pat. No. 2,876,634 for a "Thermodynamic Container," was directed to the solution of these problems. This disclosure illustrated a coffee cup having a heat-storage material between its walls that absorbed heat from hot coffee poured into the cup. Beeswax was selected as the heat-storage material for its melting point of 147° F. was near the preferred drinking temperature of coffee. This material was capable of storing 45 additional calories of heat per gram because of its latent heat of fusion. Hot coffee above 147° F. melts the beeswax, thereby cooling the coffee until its temperature falls below 147° F. at which time the heat stored in the melted beeswax, as its latent heat of fusion, returns to the coffee keeping its temperature near 147° F. for an extended period.

As the coffee begins to cool by radiation, conduction and convection, its temperature falls below 147° F. causing heat stored in the liquefied beeswax, principally as its latent heat of fusion, to be released back to the coffee. In this way, the coffee will be kept at a drinkable temperature near the melting point of the beeswax for a longer time than usual.

Considerable research and experimentation in the development of this invention resulted in a more perfect means than shown in the prior art of rapidly conducting the heat from the hot beverage to the storage material, dispersing it rapidly through the storage material and holding it for return to the beverage as the beverage cools.

An object of the present invention is to provide a construction of materials which lend themselves more readily to mass production.

A further object of this invention is to provide a more adequate means for holding the heat-storage material so as to prevent the heat from escaping through the outside walls of the container.

Another object of this invention is to discover a selection of suitable heat-storage materials to adapt the thermodynamic container for cooling foods and beverages to a variety of preselected temperature ranges.

And still a further object of this invention is to provide an adhesive bonding which would provide the necessary flexibility to allow for the different coefficients of expansion of the components of this invention.

Attainment of these objects and solution of other problems inherent in Zimmerman's disclosure in U.S. Pat. No. 2,876,634 and in my own disclosure for "Temperature Retaining Means," in the now abandoned u.S. Pat. application, Ser. No. 141,814, are to be found in the present invention in the novel inclusion of a metal capsule as the means for holding the heat-storage substance. This capsule is fully insulated from the outer shell, which is attached to the metal capsule by a flexible adhesive.

Further objects and advantages of the invention will become apparent from the following detailed description and annexed drawings, wherein.

Figure 1:
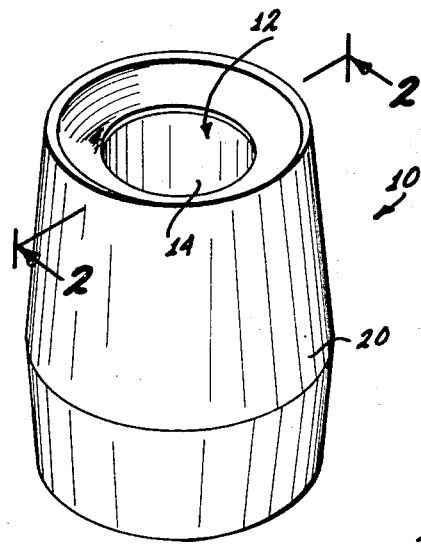
FIG. 1 is a perspective view of a preferred embodiment of the invention.
Figure 2:
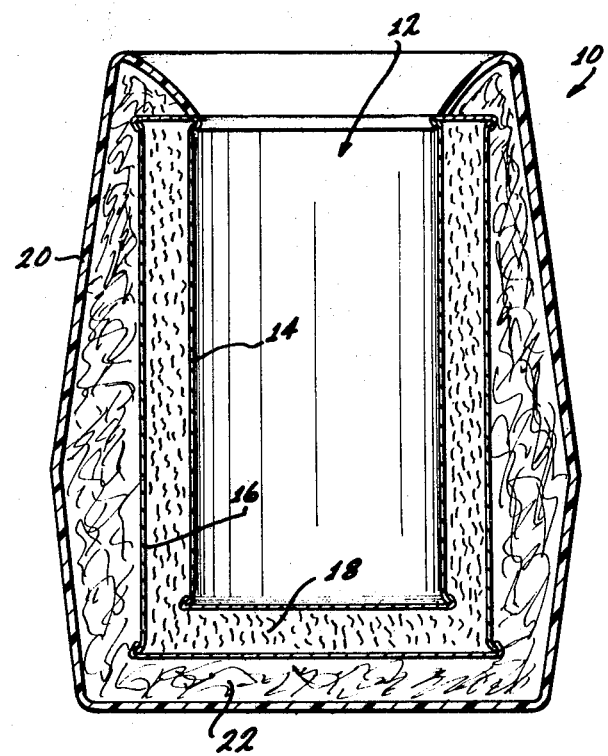
FIG. 2 is a sectional view of the invention illustrated in FIG. 1 taken along line 2—2.
Figure 3:
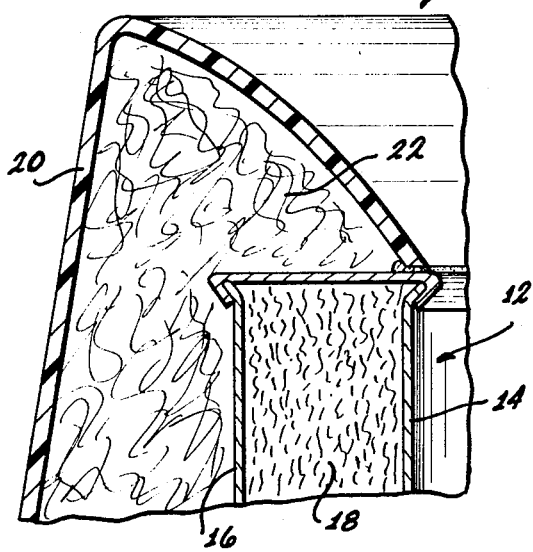
FIG. 3 is a cutaway sectional view to illustrate the flexible adhesive attachment between the outer shell and the inner capsule.

Referring more specifically to the drawings, the numeral 10 is used to designate the preferred embodiment illustrated in FIGS. 1 and 2. The inner metal capsule 12 has an inner wall 14 and an outer wall 16 which may be joined by "double-fold" seaming on a conventional can-closing machine. It is also possible, however, to join the walls of the metal capsule 12 by cementing, soldering or sealing with plastic sealants. The inner wall 14 of the capsule is an impact-extruded seamless aluminum beer can about 0.008 of an inch thick, anodized to give a more attractive appearance. The outer wall 16 of the capsule is a conventional can body about 0.015 of an inch thick. Any metal can be used that is sturdy enough for physical handling, but commercially practical selections would be aluminum or steel.

Although the inner capsule 12 is of double-walled construction in this embodiment of the invention, it can also be made in three pieces prior to assembly. If it is desirable for cost reasons, one, two or three different metals can be used; however, replacement of metal by plastic or other nonmetallic material does not prove satisfactory.

Since the inner wall 14 is the surface which is in contact with the beverage or food, replacement of the outer wall 16 was thought possible. It was found, however, that a totally metal capsule functioned slightly faster than one having only a metal inner wall, for in order to achieve fast cooling to the desired temperature range, the materials chosen for both the inner and outer walls of the metal capsule had to have a low specific heat and high thermal conductivity. The conductivity of the capsule 12 is greater than the intended food or beverage placed inside the finished container in order not to limit the rate of heat conduction between the food or beverage and the heat storage material 18.

The mass of the capsule 12 is kept to a minimum to prevent creating a heat sink between room temperature and the selected temperature range of the metal capsule.

The heat storage material 18 between the walls of the capsule 12 can be varied to include many materials. It must conduct heat as well as the food or beverage placed inside the thermodynamic container and must utilize either a change in physical state (solid to liquid or liquid to solid) or a change from one crystalline state to another in the selected temperature range in order to maintain the contents of the thermodynamic container within that range for 30 minutes.

The following materials were actually tested. The transition temperature was noted (melting point, crystallization temperature, temperature of hydration) as well as the heat of transition as reported in the literature.

| Material | Transition Temperature | |
| --- | --- | --- |
| 1. Beeswax | 147° F. | 42 calories per g. |
| 2. Stearic acid | 154° F. | 47 calories per g. |
| 3. Triglyceryl stearate | 130° F. | 45 calories per g. |
| 4. Ferrous sulfate-7-hydrate $FeSo_4.7H_2O$ | 147° F. | 56 calories per g. |
| 5. $Na_4B_4O_7.10H_2O$ | 141° F. | 68 calories per g. |
| 6. $Ha_2B_2O_4.8H_2O$ | 129° F. | 68 calories per g. |
| 7. Refined paraffin | 128° F. to 130° F. | 35 to 58 calories |
| | 133° F. to 135° F. | per g. depending on |
| | 143° F. to 145° F. | oil content, purity, |
| | 150° F. to 152° F. | melting range and |
| | 160° F. to 165° F. | the like. |
| 8. Cerro-alloys | 119° F. | |
| | 140° F. | |

Together with these materials which undergo a change of state, another material to improve the conductivity of the heat through the heat-storage medium is needed. Since the conductivity at least equal to that of water was the objective, which would typify the food or beverage conductivity, water itself was used together with crystalline hydrates. In the case of paraffin, a powdered metal was used to replace earlier usage of metal wool. A metal powder flake was selected so less than 1 percent was retained in the 325-mesh sieve. A dispersion of the powder flake was made in a paraffin mixture previously prepared of selected melting-point fractions.

The paraffin mixtures whose heat conductivity was increased with powdered metal were found to react much faster than the salts of hydration and crystallization appearing in the above list. The salts were corrosive in contact with metal containers. Beeswax was expensive and was found to be a poorer conductor of heat than the paraffin and metal composition.

Different metals were tested for addition to the paraffin whose conductivity was found equivalent to cork. Mixtures using powdered copper were definitely faster than those with aluminum. Seventy percent copper was used in one case. The cost of copper was prohibitive, the weight was objectionable, and the toxicity if ingested was disqualifying.

Aluminum of several types was evaluated. Settling occurred with spherical particles and large flakes in low-viscosity mixes. A fine flake (used for pigment applications), less than 1 percent retained on a 325-mesh screen, was retained in molten paraffin for 200 hours with no settling observed in a mixture of 45 percent aluminum powder and 55 percent paraffin. It was found that the spherical aluminum particles of the same mesh size tended to settle out.

The rate of cooling of the contents of the container utilizing the various mixtures of aluminum and paraffin was recorded. The mixture of 20 percent aluminum and 80 percent paraffin did not give enough conductivity to the paraffin mixture to optimize the rate of temperature change of the heat-storage material. With the use of the slower rate of heat transfer, the plateau in the desired range was also shortened. Over 50 percent aluminum powder was unsatisfactory as it appeared that the molten paraffin tended to remain in an amorphous state, was less mobile and did not reflect the same heat of transition as it did when permitted enough fluidity in the molten state to assume better crystallinity in the solid state. Also the time within the desired temperature plateau decreased and, apparently, the crystallization of the paraffin was suffering some interference.

The desired composition for fast cooling to 150°F. and for maximum time in the 130°F. to 150°F. range is 45 percent aluminum powder (99 percent flaked through 325 mesh) and 55 percent paraffin (75 percent with a melting point between 133° F. –135° F. and 25 percent with a melting point between 160° F.–165° F).

Either ceramic or plastic may be used in the outer shell 20.

After screening a series of adhesives in a heating-cooling cycle with exposure to water as in a dishwashing cycle, a epoxypolysulfide adhesive was selected to bond the metal capsule to the plastic outer shell. ABS and polypropylene were selected as materials for the other shell because of their comparatively low cost and high-heat distortion temperature. A flexible adhesive is necessary because of the different coefficients of expansion of the capsule and the outer shell.

To minimize the heat loss from the outer shell, an insulation layer of felt or plastic foam is used between the metal capsule and plastic outer shell. The insulation material 22 and its distribution in the thermodynamic container are best seen in FIG. 2.

From the foregoing, those skilled in the art will readily understand and appreciate the nature and utility of the invention and the manner in which it achieves and realizes the objects and advantages over the previous art disclosed in my abandoned U.S. Pat. application, Ser. No. 141,814, and also disclosed in the Zimmerman Pat. No. 2,876,634. In this invention, the inclusion of a metal capsule as a means for containing the heat-storage material surrounded on one side by insulation material and adhesively bonded to an outer shell permits heat to rapidly pass from the hot beverage into the walls of the capsule and enter the heat-storage material from all sides. In combination with the dispersion of metal flakes throughout the heat-storage material, a conduction of heat is possible at a much faster rate than obtainable in earlier models of the prior art.

Adhesive bonding between the inner capsule and the outer shell provides much greater flexibility than obtainable by a threaded connection.

The novelty of using a cutaway sectional can adhesively bonded to an outer attachment readily lends itself to mass production.

The insulation separating the inner metal capsule from the outer shell essentially solves the problem of heat loss through the outer shell that was inherent in the design of models of the prior art.

Selection of any of various compositions for a heat-storage material will allow a beverage at 190°–200° F. to be cooled within 2 minutes to a selected temperature range of 110°–120° F., 120°–130° F. 130°–140° F., and the like and to be maintained in that range for a period of 30 minutes.

The foregoing disclosure is representative of a preferred form of the invention and is to be interpreted in an illustrative rather than a limiting sense, the invention to be accorded the full scope of the claims appended hereto.

I claim:

1. A thermodynamic container comprising
   an outer shell,
   a hollow internal capsule being attached to said outer shell so that a space is provided between said outer shell and said internal capsule, and
   a heat-storage material exhibiting a change of state in the range of 150° F. to 120° F. and contained inside of the walls of said internal capsule.

2. A thermodynamic container as in claim 1 in which said internal capsule is adhesively bonded to said outer shell.

3. A thermodynamic container as in claim 1 in which said space between said internal capsule and said outer shell is filled with insulation material.

4. A thermodynamic container as in claim 1 in which said internal capsule is made of aluminum.

5. A thermodynamic container as in claim 1 in which said heat-storage material has the composition of essentially 45 percent aluminum powder and essentially 55 percent paraffin.

6. A thermodynamic container as in claim 2 in which said adhesive is a epoxypolysulfide adhesive.

7. A thermodynamic container as in claim 1, in which said insulation material is a plastic foam.

8. A thermodynamic container as in claim 1, in which said insulation material in felt.

9. A thermodynamic container as in claim 1 wherein said outer shell is composed of a material having a low thermal conductivity and said internal capsule is composed of a material with a high thermal conductivity.